(No Model.)

R. M. HUNTER.
ELECTRIC MOTOR OR DYNAMO ELECTRIC MACHINE.

No. 405,668. Patented June 18, 1889.

WITNESSES:
Henry Drury
George F. Drury

INVENTOR:

UNITED STATES PATENT OFFICE.

RUDOLPH M. HUNTER, OF PHILADELPHIA, PENNSYLVANIA.

ELECTRIC MOTOR OR DYNAMO-ELECTRIC MACHINE.

SPECIFICATION forming part of Letters Patent No. 405,668, dated June 18, 1889.

Application filed January 28, 1889. Serial No. 297,795. (No model.)

*To all whom it may concern:*

Be it known that I, RUDOLPH M. HUNTER, of the city and county of Philadelphia, and State of Pennsylvania, have invented an Improvement in Electric Motors or Dynamo-Electric Machines, (Case 81,) of which the following is a specification.

My invention has reference to electric motors or dynamo-electric machines, with particular reference to their application as a means for the propulsion of vehicles, all of which is fully set forth in the following specification and shown in the accompany drawings, which form a part thereof.

I have found that an electric motor may be advantageously made with an armature composed of two sets of coils, each set of which is connected with separate commutators, because by this construction the motor may be more thoroughly regulated by varying the internal resistance of the armature and the number of coils in circuit. Furthermore, I have found that in a motor of this construction the commutator-brushes may be secured in rigid position and need not be shifted or be given lead in reversing the motor. In fact, any material variation of the brushes from one position for both directions of rotation produces sparking. This it will be seen simplifies the management of the motor under duty and particularly adapts it to work in propelling vehicles where the brushes on the motor are not easily gotten at.

In carrying out my invention I wind my armature with coils arranged alternately and with alternate coils coupled to the same commutator, but to different segments, and, preferably, the commutators may be arranged at opposite ends of the armature. The four brushes and field-coils are connected with the source of electric supply through a regulator, whereby the two sets of armature-coils may be coupled in series or parallel with respect to the source of electric supply. In most cases the armature-coils, taken as a unit, would be coupled in series with the field-coils. The regulator is also formed so as to cut out one of the sets of armature-coils. The regulator may be of any suitable construction, as may also be the winding on the armature and field coils.

It is not new to provide armatures of dynamo-electric machines with double windings and two commutators, as such have been designed for electroplating; but the constructions and combinations whereby a motor of this type is applicable to the propulsion of cars in the manner herein set out is new.

Figure 1:
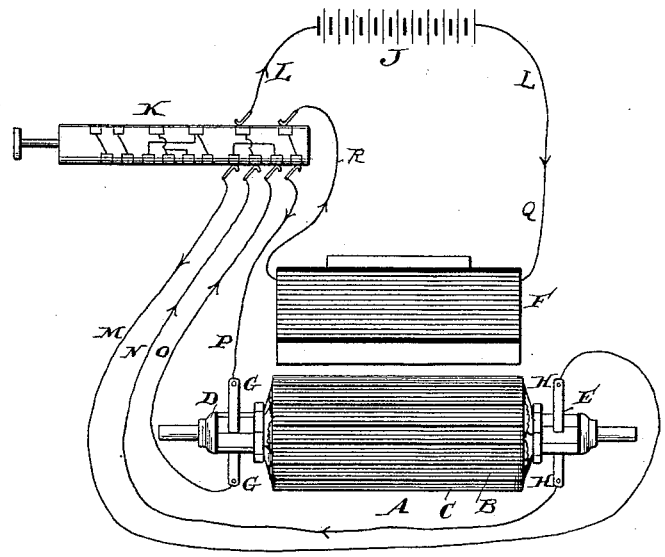
Figure 2:
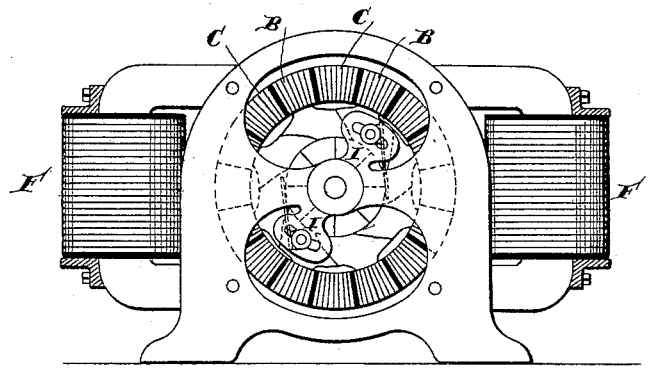
Figure 3:
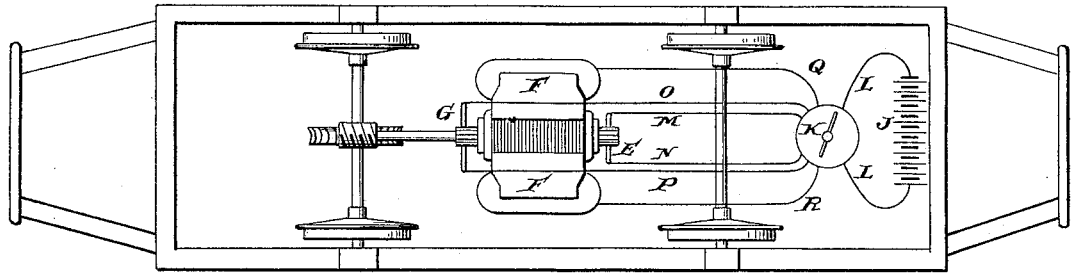

In the drawings, Figure 1 is a plan view (diagrammatic) illustrating the arrangement of the motor-coils, source of electric supply, and regulator. Fig. 2 is an end elevation of an electric motor or dynamo embodying my invention, and Fig. 3 is a plan view showing my motor and connections applied to a car.

A is the armature, and consists of a suitable core wound with two sets of coils B and C, which are preferably arranged alternately and coupled with the commutators D and E, arranged one at each end, as shown. The winding may be of the Gramme or the Siemens type, and is in effect as if two armatures were squeezed longitudinally into one with the understanding that the coils are preferably arranged alternately—that is to say, the succession of coils would be made up alternately from the two sets of coils.

F is the field-magnets and may be made in any suitable manner.

It will be seen that the corresponding sections of the two commutators are arranged out of line, or one in advance of the other, to correspond to the coils of the armature.

G H are the brushes for the two commutators, and these brushes are rigidly bolted or otherwise secured to the frame of the machine, as at I. The source of electric current may be a battery or a generator J of any suitable and well-known type. This form of motor is particularly well adapted to electric-car work, where storage-batteries carried by the car is the source of power.

K is the regulator, which may be of any construction, provided that it can couple the coils of the armature in series or parallel. The regulator shown connects with the source of power by wires L and with the brushes of the motor by wires M N O P, and also with the field-magnets by wires Q R. Three movements of the regulator are provided for, one being to couple the two sets of brushes in series with each other and with the field-coils, the next being for coupling the two pairs of brushes in parallel and in series with the field-coils, and the last being to cut out one of the pairs of commutator-brushes.

Referring to Fig. 3, we have the motor connected with the axle, so as to propel the car by gearing, and the regulator K and source of power arranged upon the car and connected by circuits, as indicated in Fig. 1. I have not shown the reversing-switch or cut-out switch, as those devices are well known and need no explanation. On test it is found that in starting the motor the armature-coils may be put in series and thus double the internal resistance at a time when the counter electromotive force is *nil* and during the time it is increasing. When the speed is attained, the two sets of coils may be coupled in parallel to reduce the resistance of the armature and thus materially increase the power with the strong current employed. This is more particularly the case when employing storage or other batteries on cars, because then the electro-motive force is small and the current is large. This construction applies equally well to dynamo construction.

I do not limit myself to the details herein set out, as they may be modified in various ways without departing from my invention.

Having now described my invention, what I claim as new, and desire to secure by Letters Patent, is—

1. In an electrically-propelled car, a motor geared to the axle and having field-magnets and a rotating armature-core, in combination with two sets of coils of insulated wire wrapped about said core and substantially uniformly distributed and independently insulated, a commutator at each end of the armature, each having its contact segments connected to alternate coils, two pairs of brushes, one pair for each commutator, a source of electric supply and connecting-circuits between its field-magnets, commutator-brushes and source of electric supply, whereby the field-magnets are permanently in series with the armature and source of electric supply.

2. The combination of an electrically-propelled vehicle, an electric motor mechanically connected to drive the axle formed of field-magnets and two sets of armature-coils having a commutator for each set of coils, a battery carried by the vehicle, a regulator also carried by the vehicle for coupling up the two sets of armature-coils in series or multiple and maintain them when energized in series with the field-magnets, and separate connecting-circuits between the battery, field-magnets, the two sets of armature-coils, and the regulator.

3. The combination of an electrically-propelled vehicle, an electric motor mechanically connected to drive the axle and formed of field-magnets and two sets of armature-coils having a commutator for each set of coils, a battery carried by the vehicle, having its cells connected in series, a regulator also carried by the vehicle for coupling up the two sets of armature-coils in series or multiple and maintain them in series with the field-magnets, and separate connecting-circuits between the battery, field-magnets, the two sets of armature-coils, and the regulator, whereby the battery-cells are always in series with the motor.

4. An electrically-propelled vehicle having an electric motor mechanically connected to its axle and formed of field-magnets, two sets of armature-coils in one structure and in which the field-magnet coils are in series with the armature-coils, a commutator for each set of coils, and a pair of brushes for each commutator, in combination with a source of electric supply, separate circuits for connecting the field-magnet coils and each set of armature-coils with the source of electric supply, and a regulator to couple the armature-coils in series or multiple with the source of electric supply.

In testimony of which invention I hereunto set my hand.

R. M. HUNTER.

Witnesses:
ERNEST HOWARD HUNTER,
E. M. BRECKINREED.